July 8, 1958          E. P. SMITH          2,842,718
CIRCUIT INTERRUPTERS
Filed Sept. 28, 1953          4 Sheets-Sheet 1
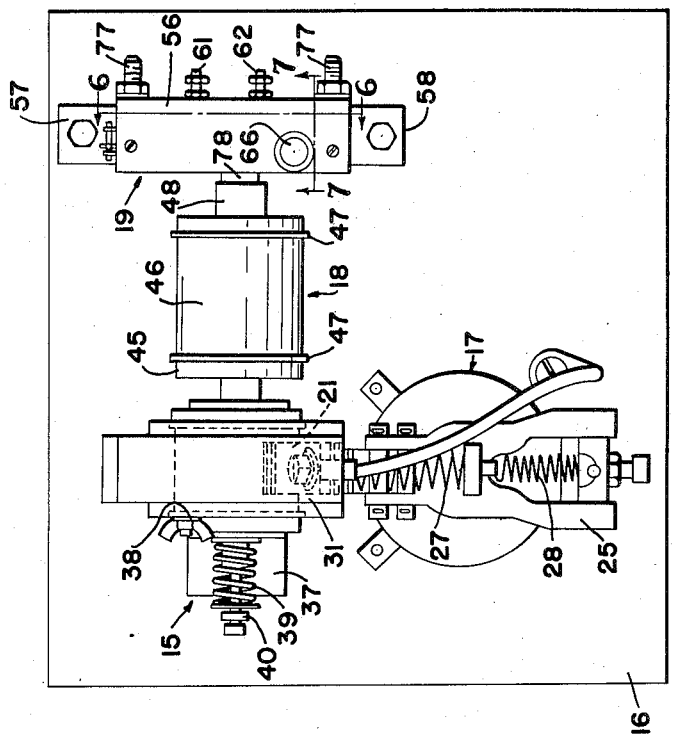
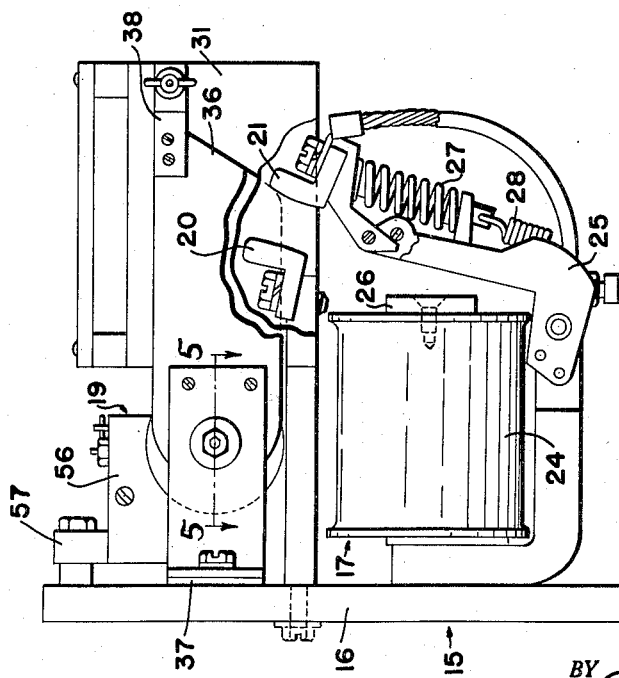
INVENTOR.
Edward P. Smith
BY Woodling and Krost,
ATTORNEYS July 8, 1958
E. P. SMITH
2,842,718
CIRCUIT INTERRUPTERS
Filed Sept. 28, 1953
4 Sheets-Sheet 2
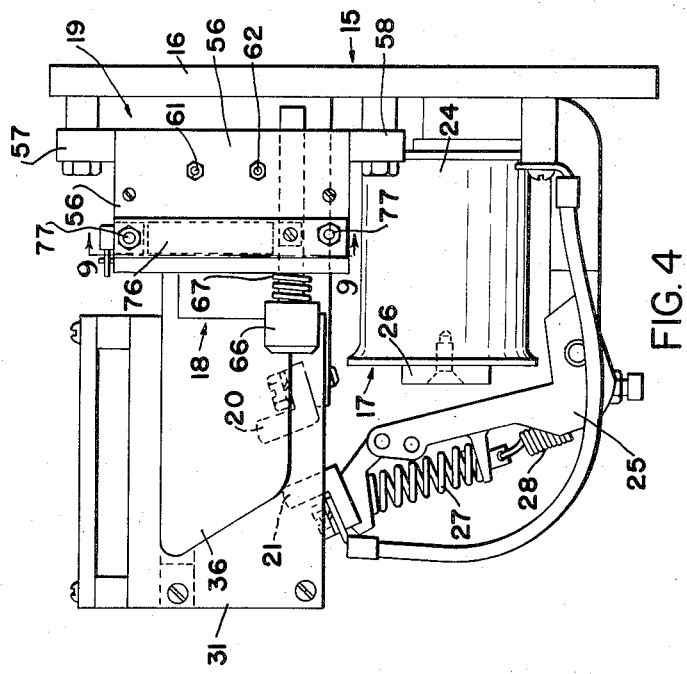
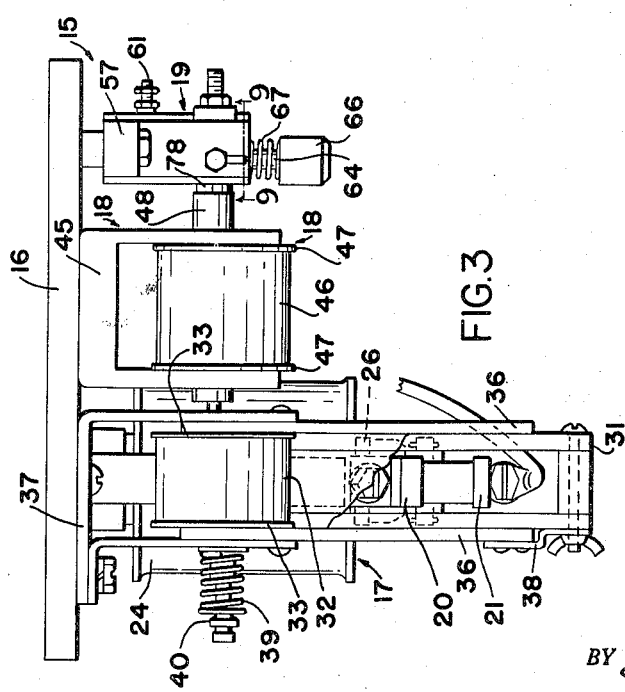
INVENTOR.
Edward P. Smith
BY Woodling and Krost,
ATTORNEYS

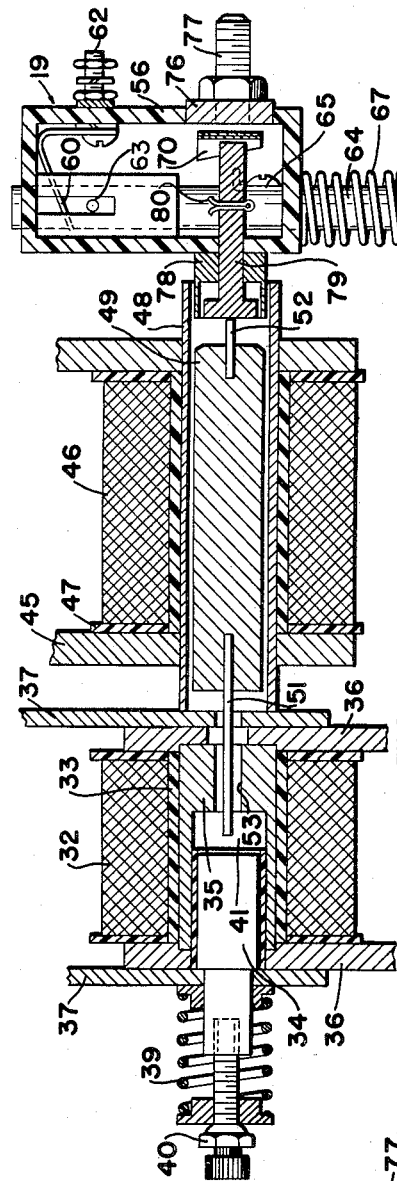

July 8, 1958  E. P. SMITH  2,842,718
CIRCUIT INTERRUPTERS
Filed Sept. 28, 1953  4 Sheets-Sheet 4

INVENTOR.
Edward P. Smith
BY Woodling and Kroot,
ATTORNEYS

United States Patent Office 2,842,718
Patented July 8, 1958

2,842,718

CIRCUIT INTERRUPTERS

Edward P. Smith, Mansfield, Ohio, assignor to The Ohio Brass Company, Mansfield, Ohio, a corporation of New Jersey Application September 28, 1953, Serial No. 382,681

9 Claims. (Cl. 317—13)

The invention relates in general to the structure and circuit of a circuit interrupter and more particularly to a safety ground cable protected direct current circuit supplying an electrical machine wherein the safety ground cable normally carries no current and maintains the machine frame at ground potential.

Safety ground cables are often used in mines with the rail or other conductor used as the main ground conductor. The individual pieces of mining equipment, such as mining machines, conveyors, loaders, drills, pumps, etc., operate in parallel off the main direct current supply conductors with each piece of mining equipment individually protected by a circuit interrupter. In many cases the metallic frames of the individual pieces of mining equipment may be in physical contact, such as a loader may contact a coveyor. In such case, if a fault occurs on one machine which opens the main contacts in the circuit interrupter thereof, fault current from another machine in contact therewith may flow through the metallic frames and back to the main ground conductor of the mine. Thus, it is distinctly possible that heavy current may flow through the ground conductor for considerable time even though the main contacts of a circuit interrupter are open. Thus, it is a feature of the present invention that the ground cable to each machine shall remain a continuous conductor at all times and to carry all stray currents without burning out.

An object of the invention is to provide a circuit interrupter adapted for use with alternating current as well as direct current, which will protect an electrical machine and protect the workmen around the machine.

Another object of the invention is to provide a circuit interrupter which maintains the frame of the electrical machine at ground potential despite opening of the circuit interruper.

Another object of the invention is to provide a circuit interrupter having control contacts controlling main contacts and wherein the control contacts are operated by any one of thermal overload, short circuit current, or current in the safety ground cable.

Another object of the invention is to provide a circuit interrupter which will open the power supply conductors, yet maintain the safety ground cable connected in the circuit so that any stray currents from any condition will be conducted to the ground and thereby establish the frame of the machine at ground potential.

Another object of the invention is to provide a circuit interrupter for an electrical machine which will open the supply circuit upon current in a safety ground cable and maintain the ground cable circuit closed through a ground cable solenoid coil of essentially the same current carrying capacity as the ground cable to prevent burnout of the coil.

Another object of the invention is to provide a circuit interrupter which will maintain the frame of an electrical machine continually at ground potential and even during the moment of opening the main contacts in the power supply conductors.

Another object of the invention is to provide multiple actuation of control contacts by a plurality of circuit conditions with control contacts controlling main contacts.

Another object of the invention is to provide a circuit interrupter which will protect not only the supply circuit but also the electrical machine on which the electrical fault occurs, other electrical machinery in physical contact with the faulty machine, and all workmen around the machines.

Other objects and a fuller understanding of this invention may be had by referring to the following description and claims, taken in conjunction with the accompanying drawings, in which:

Figure 1 shows a front elevational view of the circuit interrupter;

Figure 2 shows a left side elevational view of the interrupter;

Figure 3 shows a plan view of the interrupter;

Figure 4 shows a right side elevational view of the interrupter;

Figure 5 is an enlarged sectional view on the line 5—5 of Figure 2;

Figure 6 is an enlarged sectional view on the line 6—6 of Figure 1;

Figure 7 is an enlarged sectional view on the line 7—7 of Figure 1;

Figure 8 is an enlarged sectional view similar to Figure 7 with the control contacts in an open position;

Figure 9:
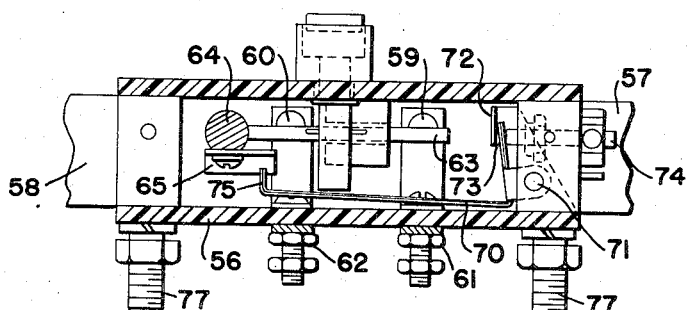
Figure 9 is an enlarged sectional view on the line 9—9 of Figure 3.

The Figures 1 to 4 generally show the exterior views of the entire circuit interrupter 15. The interrupter 15 is mounted on a base 16 which may be either conducting or non-conducting, but in this case is made non-conducting. The base carries a magnetic contactor 17, a ground current solenoid 18, and a thermal overload relay 19. The magnetic contactor 17 includes cooperating main contacts 20 and 21 and represents one form of switch which may be electrically controlled. Other forms of switches which may be utilized are the circuit breaker which has a magnetic trip coil and generally is manually closed, or circuit breakers of the electrical reclosing type, whether or not such circuit breakers have blowout coils, arc runner plates, or a combination of both.

The magnetic contactor 17 includes a magnet or holding coil 24 and a movable armature 25. The main contact 21 is carried by the armature 25 and upon energization of the holding coil 24, the armature 25 will be attracted to the pole piece 26 of the holding coil 24 against the urging of gravity and/or springs 27 and 28 to bring together main contacts 20 and 21.

The contacts 20 and 21 are shrouded by a non-conducting arc chute 31. A blowout coil 32 is mounted on an insulating spool 33. A magnetic armature 34 is positioned within the spool 33. A magnetic shunt 35 is also positioned within the spool 33 and cooperates with the armature 34. Blowout plates 36 extend from the shunt 35 on either side of the arc chute 31 to a position adjacent the main contacts 20 and 21. The blowout coil 32 is supported by a non-magnetic bracket 37. The arc chute 31 may be supported in any convenient manner, such as by the bracket 38 carried on one of the blowout plates 36. A compression spring 39 is adjustably carried between the bracket 37 and the armature 34 by an adjustable nut 40. The spring 39 urges the armature 34 to the left as shown in Figure 5 to establish an air gap 41 relative to the magnetic shunt 35.

The ground current solenoid 18 includes a magnetic

U-shaped bracket 45 which supports a ground current coil 46 mounted on an insulating spool 47. A non-magnetic tube 48 is mounted within the bracket 45 and extends therethrough. This non-magnetic tube may be brass or equivalent material. A magnetic armature 49 slides within the tube 48 and is generally coaxial with the armature 34. The armature 49 has a first rod 51 and a second rod 52 protruding from opposite ends thereof. The first rod 51 extends through a bore 53 in the magnetic shunt 35. The rod 51 is adapted to be engaged by the armature 34.

The thermal overload relay 19 has an insulated housing 56. Terminal feet 57 and 58 are provided on opposite ends of the housing 56 to provide support from the base 16 and to provide electrical connection of the heavy conductor to the thermal overload relay 19. First and second control contacts 59 and 60 are mounted on the inside of the housing 56 and are connected to control terminals 61 and 62, respectively, which extend through the wall of the housing 56. The contacts 59 and 60 are adapted to be bridged by a control switch arm 63 carried by an insulating rod 64. The insulating rod 64 carries a latch member 65. A reset push button 66 is carried on the outer end of the insulating rod 64, and a compression spring 67 is disposed between the button 66 and the housing 56.

An L-shaped bimetallic lever 70 is carried by a pivot 71 in the terminal foot 57. A leaf spring 72 is carried on the terminal foot 57 and engages the short arm 73 of the lever 70 to urge the lever 70 in a clockwise direction as viewed in Figure 9. The bimetallic lever 70 extends longitudinally within the housing 56 and has a hooked end 75 cooperating with the latch 65. An adjustable screw 74 adjusts the position of the hooked end 75 of lever 70, and thereby adjusts the temperature to which lever 70 must be heated before the latch 65 is released. The Figure 7 shows the reset button 66 depressed until the hooked end 75 is held by the latch 65. In this position the switch arm 63 bridges the control contacts 59 and 60. The Figure 8 shows the same view only with the bimetallic lever 70 moved to the right to release the latching engagement between the hooked end 75 and latch 65 so that the spring 67 urges the insulating rod 64 outwardly and thus the control switch arm 63 is no longer in contact with the contacts 59 and 60. A heater strip 76 is mounted in a cut away portion of the housing 56 and is in heat exchange relationship with the bimetallic lever 70. The heater strip 76 bridges and is fastened to the terminal feet 57 and 58 by heater terminals 77. A non-magnetic guide 78 is carried on the housing 56. A plunger 79 slides within the guide 78 and is held in the housing 56 by a pin 80. The thermal overload relay 19 is mounted on the base 16 so that the plunger 79 is generally coaxial with the armatures 34 and 49.

The Figures 6 and 7 show the reset button 66 depressed so that the control contacts 59 and 60 are closed. When the bimetallic lever 70 has been moved to the right as viewed in Figures 5 and 8 to unlatch the insulating rod 64, the control contacts 59 and 60 will be open through action of the spring 67. The Figure 5 shows the armature 49 moved to the right so that the rod 52 abuts and moves the plunger 79 to unlatch the control contacts 59 and 60. When the reset button 66 is again depressed, the leaf spring 72, acting through the bimetallic lever 70, will move the plunger 79 and armature 49 to the left so that the rod 51 is adjacent or substantially abuts the armature 34.

Figure 10:
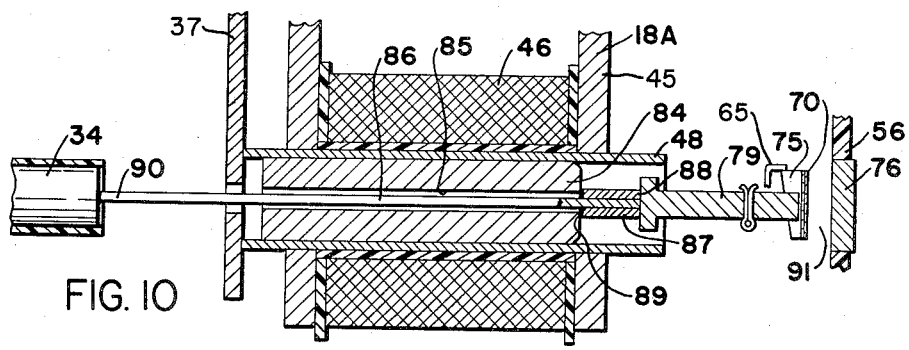
Figure 10 is a sectional view like Figure 5 showing a modification.

The Figure 10 shows a modified ground current solenoid 18A. In this modification an armature 84 is used which has an axial bore 85. A pin 86 extends through the bore 85 and has a head 87 which is fastened on the pin 86 in any suitable manner. The armature 84 is magnetic, and the pin 86 and head 87 are preferably non-magnetic. The head 87 has a forward end 88 to engage the plunger 79 and has a rearward end 89 to engage the armature 84. The left end 90 of the pin 86 is engageable by the armature 34. The Figure 10 differs from the Figure 5 in that the bimetallic lever 70 is shown as being in the latched position, which is the position wherein it is moved to the left. This is evidenced by the enlarged space 91 which is larger than the corresponding space in Figure 5. Figure 10 shows that with the bimetallic lever 70 in the latched position, the plunger 79 has moved the rod 86 to the left so that it engages or nearly engages the armature 34. Further, the rearward end 89 of the head 87 has engaged the armature 84 to move it to the left so that the right end thereof is approximately adjacent the inner wall of the bracket 45. This is a position of maximum megnetic pull on the armature 84 from the bracket 45.

Figure 11:
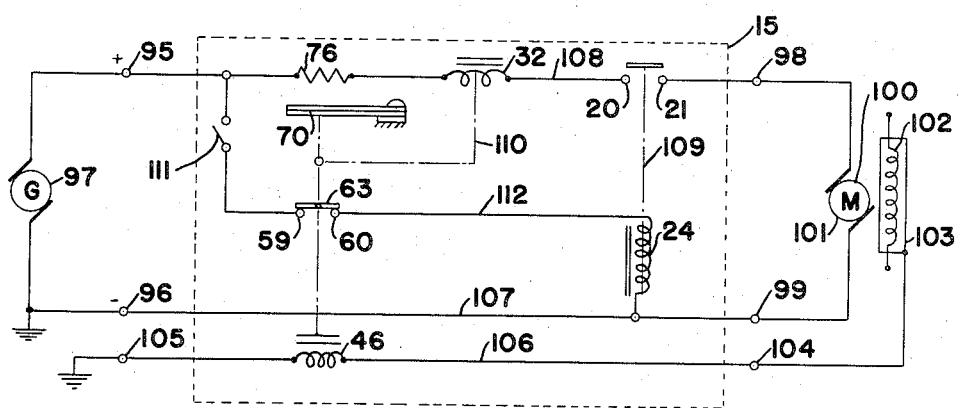
Figure 11 is a circuit diagram of the circuit interrupter.

The Figure 11 shows a circuit diagram of a circuit in which the circuit interrupter 15 may be used. The parts previously identified in the drawings are given the same numbers in the schematic diagram of Figure 11. The circuit of Figure 11 shows positive and negative direct current supply terminals 95 and 96, respectively. Such supply terminals may be energized from any suitable source, such as a generator 97. The circuit interrupter 15 is connected to these supply terminals 95 and 96. The circuit interrupter 15 in turn supplies power to load terminals 98 and 99, and a typical load is illustrated by a motor 100 having an armature 101. The motor 100 is provided with a field 102 which may be supplied from any convenient voltage source, not illustrated. A typical connection would be to have the motor field 102 connected across the armature 101 through connections made by a motor controller, not shown. The field 102 is shown as being contained in a frame 103 of the motor, which also would house the armature 101. The frame 103 is connected to a ground cable load terminal 104. The direct current supply source may be considered as having a ground terminal 105, and a ground conductor or cable 106 interconnects the terminals 104 and 105. The ground current coil 46 is connected in series in the ground cable 106. A negative conductor 107 interconnects terminals 96 and 99. A positive conductor 108 interconnects the terminals 95 and 98. Connected in series in the positive conductor 108 are the heater strip 76, the blowout coil 32, and the main contacts 20 and 21. The mechanical interconnection means between the magnet coil 24 and main contacts 20 and 21 is shown by the dot-dash line 109, and the mechanical interconnection between the blowout coil 32, the bimetallic lever 70, the control switch arm 63, and the ground current coil 46 is shown by the dot-dash line 110. An on-off switch 111 and conductor 112 connect in series the control switch 59–60 and the magnet coil 24. This series combination is connected across the supply terminals 95 and 96.

*Operation*

The schematic diagram of Figure 11 and the sectional views at Figures 5, 6, 7, and 8 are perhaps easiest from which to understand the operation. The blowout coil 32 is wound from heavy conductor wire since it is connected in series with the positive conductor 108 and carries the motor or full load current. It, therefore, is a few turns of large cross-sectional area conductor. As an example, the motor 100 may be considered as operating on a rated current of approximately two hundred amperes. Similarly, the heater strip 76 will be of a size and resistance value capable of passing this two hundred amperes. The ground current cable 106 normally carries no current and performs a safety function in that it maintains the motor frame 103 at ground potential. This ground cable, however, is capable of carrying heavy currents should the need arise and may, for example, be of a size suitable to carry fifty to one hundred amperes. The ground current coil 46 is wound of large diameter conductor of essentially the same size as the ground cable 106. This assures that the ground current coil 46 will carry all the current which the ground cable 106 carries without burning out.

To start the operation the on-off switch 111 is closed, the manual reset button 66 having been previously depressed to close the control contacts 59–60. With direct current voltage at the terminals 95 and 96, this will energize the magnet coil 24 to close the main contacts 20 and 21. This supplies energization to the motor 100. The heater strip 76 and bimetallic lever 70 are designed to open the control contacts 59—60 upon any sustained overload of a predetermined value. This might be one hundred twenty-five per cent of rated current. Since the two hundred ampere motor might draw eight hundred amperes upon starting, the heater strip 76 would be designed to momentarily pass this large in-rush current without tripping the control contacts 59—60. Further, the blowout coil 32 would be designed to pass this in-rush current momentarialy without tripping the control contacts 59—60. The blowout coil 32 is designed to quickly open the control contacts upon short circuit or similar conditions. The blowout coil 32 has an additional function in that not only does it open the control contacts upon short circuit, but it provides a magnetic flux which, through the blowout plates 36, cooperates with the flux of the arc at the contacts 20—21 to blow out the arc within the arc chute 31. Upon short circuit conditions the armature 34 moves to the right under the influence of the rapidly increasing flux from the blowout coil 32 against the urging of the spring 39 to move the rod 51 and plunger 79 to the right as viewed in Figure 5. This moves the bimetallic lever 70 to release the latch 65 and open the control contacts 59—60. The leaf spring 72 also provides a small amount of urging which must be overcome by the armature 34. The Figure 5 shows the position of the parts after the control contacts have been tripped. The armature 49, plunger 79, and bimetallic lever 70 have been moved to the right. The spring 39 will have returned the armature 34 to the left since the main contacts 20—21 will have opened to eliminate the flux caused by the blowout coil 32. When the fault is removed and the reset button 66 again is depressed, the leaf spring 72 will move the bimetallic lever 70, plunger 79, and armature 49 to the left.

Although the ground conductor 106 may be heavy enough to carry one hundred amperes, for example, the ground current coil 46 is designed to provide enough flux to trip the control contacts with only a small value of current such as five or ten amperes. This small amount of current will establish a sufficient flux to move the armature 49 to the right into the position shown in Figure 5. This will open the control contacts 59—60 which de-energizes the magnet coil 24 and opens the main contacts 20—21.

The thermal overload relay 19 operates in conventional manner wherein overload current through the heater strip 76 heats the bimetallic lever 70, causing it to deflect outwardly, releasing the latch 65 and opening the control contacts.

The modification of Figure 10 provides that when the blowout coil 32 actuates the armature 34, the mass of the armature 84 need not be moved. Thus, the sliding friction thereof relative to the tube 48 is not encountered. The movement of the armature 34 simply moves the rod 86 to move the plunger 79. Upon actuation of the ground current coil 46, this will move the armature 84 which, through the head 87, moves the plunger 79. Upon actuating the reset button 66, the leaf spring 72 will return the bimetallic lever 70, plunger 79, rod 86, and armature 84 to the left to the position shown in Figure 10.

The circuit interrupter 15 provides a combined structure which is capable of protecting the energization supply circuit, the electrical machine or load of the circuit, as well as the workmen around the machines.

The most commonly used protective methods are a fuse, a thermal relay backed up by a fuse, a thermal relay backed up by a circuit breaker, or a circuit breaker with a time delay trip for overloads and an instantaneous trip for short circuits. These methods give reasonably satisfactory protection to cables and machines in more or less permanent installations. When a fault develops, enough current is usually available to cause prompt operation of the protective device. However, the fault current must rise to a value higher than the peak starting current before the protective device will operate. In temporary installations, such as are found in mining service, for example, fault currents too low to trip the protective device may exist for some time. This is because the maximum available fault current is not large. Thus a small fault may have to burn into a big one before the protective device operates and in so doing will cause considerable damage. By providing the ground current solenoid 18, a circuit protective device is obtained which will open the main contacts upon relatively low leakage or fault current from the electrical windings of the machine to the frame of the machine. This initiates the tripping action when the fault current rises to five or ten amperes rather than waiting until it rises to a thousand amperes or so as would be the case if the ground current solenoid were not used.

The fact that the ground current coil 46 is wound of conductor of the same size as the ground cable 106 makes certain that all stray currents flowing through the ground conductor 106 will be passed by the ground current coil 46 without burning out. Further, it will be noted that there is no circuit opening device in the ground conductor 106; hence, the ground circuit remains closed at all times to protect the workmen who may touch the frame of the electrical machines. In some prior art forms of circuit interrupter the safety ground cable was opened when the main contacts stripped. Since it takes a certain finite time to blow out or extinguish the arc on the main power contacts, there will still be a voltage applied to the electrical machine. If contacts were placed in the ground cable which opened with the main power contacts, then for faults to the machine frame there would be a fraction of a second wherein the frame would be at a potential other than ground to thus endanger workmen around the machine. The present circuit prevents this possibility.

The fact that the blowout coil operating on short circuits, the ground current coil, and the thermal overload relay, all operate on the same control contacts 59—60 assures ease and simplicity of both manufacture and operation. This reduces the number of parts, and hence, reduces the possibility of mechanical or electrical failure of the entire circuit interrupter.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A circuit interrupter for use with a safety ground cable protected direct current circuit, comprising electrical control contacts, manual reset means to close said contacts, spring means operating on said reset means urging said contacts toward an open position, a latch to selectively hold said contacts closed upon operation of said reset means, a lever to control said latch, main contacts, electrical means to control said main contacts, a magnetic armature, second spring means urging said armature in a first axial direction, the axis of said armature intersecting said lever, interconnecting means positioned on said axis between said armature and lever, a ground cable coil surrounding said armature, a substantially closed magnetic circuit for said ground cable coil including said armature, current of a given value in said ground cable coil effecting movement of said armature against said second spring means to move said interconnecting means and said lever and hence open said control contacts, and means to electrically connect in series said electrical means and said control contacts.

2. A circuit controller for use with a safety ground cable protected circuit, comprising electrical control contacts, reset means to operate said contacts, main contacts, electromagnetic means to operate said main contacts, a series coil, a magnetic armature inside said series coil, means for urging said armature in a first axial direction, interconnecting means between said armature and control contacts, over-current on said series coil effecting axial movement of said armature against said urging means to move said interconnecting means and hence operate said control contacts, a second armature, a ground cable coil surrounding said second armature, said ground cable coil being wound from conductor substantially as large as said ground cable to prevent burnout of said ground cable coil, current in the order of two percent to fifteen percent of the current which operates said series coil armature effecting movement of said second armature to operate said control contacts, means to connect in series said series coil and said main contacts, and means to electrically connect in series said electromagnetic means and said control contacts.

3. A circuit controller for use with a safety ground cable protected circuit, comprising electrical control contacts having first and second positions, manual reset means to operate said contacts to said first position, spring means operating on said contacts urging said contacts toward said second position, a latch to selectively hold said contacts in said first position upon operation of said reset means, main contacts, electromagnetic means to operate said main contacts, a series coil, a magnetic armature inside said series coil, second spring means urging said armature in a first axial direction, interconnecting means between said armature and latch, over-current on said series coil effecting axial movement of said armature against said second spring means to move said interconnecting means and latch and hence operate said control contacts to said second position, a second armature operatively connected with said latch, a ground cable coil surrounding said second armature, a substantially closed magnetic circuit for said ground cable coil including said second armature, said ground cable coil being wound from conductor substantially as large as said ground cable to prevent burnout of said ground cable coil, current in the order of two percent to fifteen percent of the current which operates said series coil armature effecting movement of said second armature to operate said control contacts to said second position, means to connect in series said series coil and said main contacts, and means to electrically connect in series said electromagnetic means and said control contacts.

4. A circuit interrupter for use with a safety ground cable protected direct current circuit, comprising electrical control contacts, manual reset means to close said contacts, spring means operating on said reset means urging said contacts toward an open position, a latch to selectively hold said contacts closed upon operation of said reset means, a lever to control said latch, main contacts, electromagnetic means to operate said main contacts, a series coil, a magnetic armature inside said series coil, second spring means urging said armature in a first axial direction, the axis of said series coil intersecting said lever, interconnecting means positioned on said axis between said armature and lever, over-current on said series coil effecting axial movement of said armature against said second spring means to move said interconnecting means and lever and hence open said control contacts, a second armature, a ground cable coil surrounding said interconnecting means and said second armature, a substantially closed magnetic circuit for said ground cable coil including said second armature, said ground cable coil being wound from conductor substantially as large as said ground cable to prevent burnout of said ground cable coil, current in the order of two percent to fifteen percent of the current which operates said series coil armature effecting movement of said second armature without movement of said series coil armature to open said control contacts, means to connect in series said series coil and said main contacts, and means to electrically connect in series said electromagnetic means and said control contacts.

5. A circuit interrupter for use with a safety ground cable protected direct current circuit, comprising electrical control contacts, manual reset means to close said contacts, spring means operating on said reset means urging said contacts toward an open position, a latch to selectively hold said contacts closed upon operation of said reset means, a lever to control said latch, a magnetically controlled main contactor, main contacts on said contactor, means to urge said main contacts open, a holding coil to close said main contacts upon energization thereof, a blowout coil magnetically coupled to said main contacts, a magnetic armature inside said blowout coil, second spring means urging said armature in a first axial direction, the axis of said blowout coil intersecting said lever, interconnecting means positioned on said axis between said armature and lever, over-current on said blowout coil effecting axial movement of said armature against said second spring means to move said interconnecting means and lever and hence open said control contacts, a second armature, a ground cable coil surrounding said interconnecting means and said second armature, a substantially closed magnetic circuit for said ground cable coil including said second armature, said ground cable coil being wound from conductor substantially as large as said ground cable to prevent burnout of said ground cable coil, current in the order of two percent to fifteen percent of the current which operates said blowout coil armature effecting movement of said second armature without movement of said blowout coil armature to open said control contacts, means to connect in series said blowout coil and said main contacts, and means to electrically connect in series said holding coil and said control contacts.

6. A circuit interrupter for use with a safety ground cable protected direct current circuit, comprising a thermal overload device having electrical control contacts, manual reset means to close said contacts, spring means operating on said reset means urging said contacts toward an open position, a latch to selectively hold said contacts closed upon operation of said reset means, a bimetallic lever to control said latch, an overload heater strip positioned in heat exchange relationship with said bimetallic lever to operate same and open said contacts, main contacts, electromagnetic means to operate said main contacts, a series coil, a magnetic armature inside said series coil, second spring means urging said armature in a first axial direction, the axis of said series coil intersecting said bimetallic lever, a rod positioned on said axis between said armature and lever, over-current on said series coil effecting axial movement of said armature against said second spring means to move said rod and bimetallic lever and hence open said control contacts, a second armature, a ground cable coil surrounding said rod and said second armature, a substantially closed magnetic circuit for said ground cable coil including said second armature, said ground cable coil being wound from conductor substantially as said ground cable to prevent burnout of said ground cable coil, current in the order of two percent to fifteen percent of the current which operates said series coil armature effecting movement of said second armature without movement of said series coil armature to open said control contacts, means to connect in series said overload heater strip, said series coil and said main contacts, and means to electrically connect in series said electromagnetic means and said control contacts.

7. A circuit interrupter for use with a safety ground cable protected direct current circuit having first and second power conductors and an electrical machine having a safety ground conductor normally carrying no current to keep the machine frame at ground potential, comprising a thermal overload device having electrical control contacts, manual reset means to close said contacts, spring means operating on said reset means urging said contacts toward an open position, a latch to selectively hold said contacts closed upon operation of said reset means, a bimetallic lever to control said latch, an overload heater strip positioned in heat exchange relationship with said bimetallic lever to operate same and open said contacts, a magnetically controlled main contactor, main contacts on said contactor, means to urge said main contacts open, a magnet coil to close said main contacts upon energization thereof, a blow-out coil magnetically coupled to said main contacts, a magnetic armature inside said blowout coil, second spring means urging said armature in a first axial direction, the axis of said blowout coil intersecting said bimetallic lever, a rod positioned on said axis between said armature and lever, over-current on said blowout coil effecting axial movement of said armature against said second spring means to move said rod and bimetallic lever and hence open said control contacts, a second armature, a ground conductor coil surrounding said rod and said second armature, a substantially closed magnetic circuit for said ground conductor coil including said second armature, said ground conductor coil being wound from conductor substantially as large as said ground conductor to prevent burnout of said ground conductor coil, current in the order of two percent to fifteen percent of the current which operates said blowout coil armature effecting movement of said second armature without movement of said blowout coil armature to open said control contacts, means to connect in series said overload heater strip, said blowout coil and said main contacts, and means to electrically connect in series said magnet coil and said control contacts.

8. A circuit controller for use with a safety ground cable protected circuit, comprising main contacts, electromagnetic means to operate said main contacts, thermal overload means connected to control said electromagnetic means, a series coil, a magnetic armature inside said series coil, means urging said armature in a first axial direction, means to control said electromagnetic means by movement of said armature, over-current on said series coil effecting axial movement of said armature against said urging means, a second armature coaxial with said first armature and operable to control said electromagnetic means, a ground cable coil surrounding said second armature, a substantially closed magnetic circuit for said ground cable coil including said second armature, ground current in said ground current coil effecting movement of said second armature, means to connect in series said series coil, said thermal overload means and said main contacts, and means to electrically connect in series said electromagnetic means and said control contacts.

9. A circuit controller for use with a safety ground cable protected circuit, comprising electrical control contacts, bimetallic means to operate said control contacts, an axially movable armature, a ground cable coil operating through said armature and bimetallic means to control said control contacts, a second axially movable armature substantially coaxial with said first armature, a series coil acting through said second and first armatures and said bimetallic means to control said control contacts, main contacts, electromagnetic means to operate said main contacts, a heater for said bimetallic means, means to connect in series said series coil, heater, and main contacts, and means to electrically connect in series said electromagnetic means and said control contacts.

References Cited in the file of this patent

UNITED STATES PATENTS

| | | |
|---|---|---|
| 1,749,539 | Keller | June 28, 1927 |
| 2,140,360 | Jennings | Dec. 13, 1938 |
| 2,637,843 | Kammerdiener | May 5, 1953 |
| 2,666,824 | Dorfmann | Jan. 19, 1954 |

FOREIGN PATENTS

| | | |
|---|---|---|
| 548,294 | Germany | Apr. 9, 1932 |
| 469,143 | Great Britain | July 20, 1937 |